T. C. WHITING.
MOTOR CONTROLLING MECHANISM.
APPLICATION FILED JULY 31, 1916.
1,273,300.
Patented July 23, 1918.
2 SHEETS—SHEET 1.
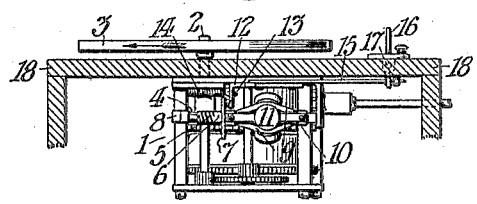
FIG. I.
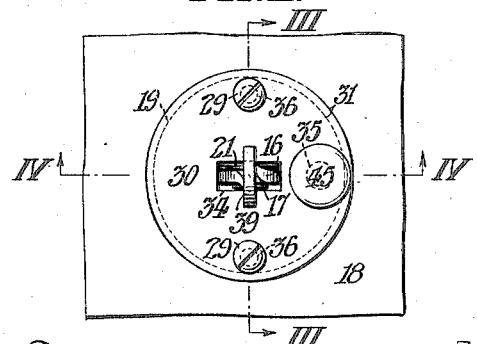
FIG. II.
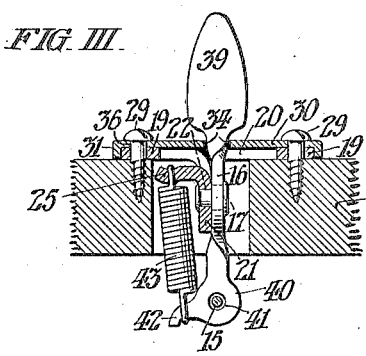
FIG. III.
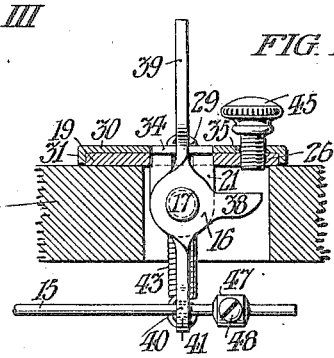
FIG. IV.
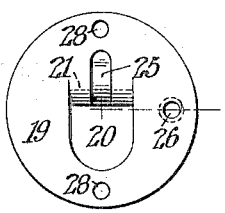
FIG. V.
WITNESSES:
INVENTOR:

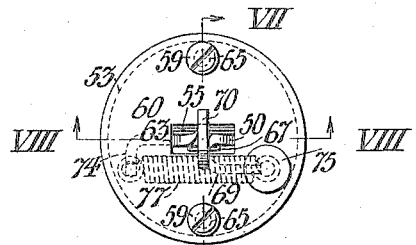
FIG. VI.
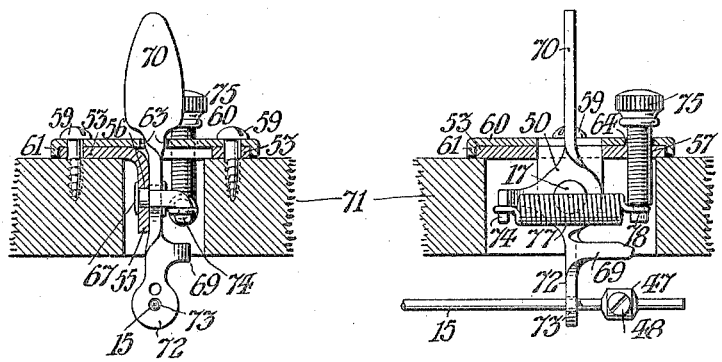
FIG. VII. FIG. VIII.
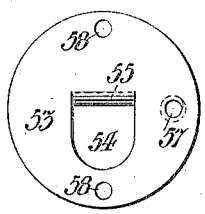
FIG. IX.

UNITED STATES PATENT OFFICE.

THEO CLIFFORD WHITING, OF PHILADELPHIA, PENNSYLVANIA.

MOTOR-CONTROLLING MECHANISM.

1,273,300.

Specification of Letters Patent.   Patented July 23, 1918.

Application filed July 31, 1916.   Serial No. 112,610.

*To all whom it may concern:*

Be it known that I, THEO CLIFFORD WHITING, a citizen of the United States, residing at Philadelphia, in the State of Pennsylvania, have invented a certain new and useful Improvement in Motor - Controlling Mechanism, whereof the following is a specification, reference being had to the accompanying drawing.

My invention may be employed with particular advantage in connection with a motor employed to rotate sound record disks in phonograph or gramophone machines. Ordinarily such motors are controlled by two entirely distinct and separate devices, to wit, first, a device which is adjustable to variably determine the rate of rotation of the motor by means of a friction brake upon a disk forming part of a governor mechanism, and, second, a brake device which frictionally engages the turn table which directly supports the sound record, so as to stop and release the motor, independently of said governor brake mechanism. It is an object of my invention to provide a motor controlling device which is independent of said turn table, but coöperative with the governor brake mechanism, to not only variably determine and regulate the rate of rotation of the motor, but start and stop it.

As hereinafter described, my invention includes the combination with a motor, having brake mechanism movable in one direction to permit said motor to operate, and in the opposite direction to stop it; of a brake spring tending to move said mechanism to stop said motor; a motor controlling lever, connected to move said brake mechanism in the opposite direction; and means adjustable to limit the movement of said controlling lever in the direction opposed by said brake spring; whereby, when said lever is shifted to the limit of its movement in the direction opposed by said brake spring; said brake mechanism is so placed, intermediate of its range of movement, as to automatically check the rotation of the motor when it reaches a rate predetermined by said adjustable means, and, when said lever is shifted to the opposite limit of its movement, it releases said brake mechanism and permits the latter to stop the motor. In the form of my invention hereinafter described, the means adjustable to vary the effect of the controller upon said brake mechanism includes both means for limiting the extent of the throw of said lever in opposition to the brake spring, and means for varying the length of the connection between the controller and the brake mechanism. The specific construction and arrangement of the governor brake mechanism described and shown in this case, is claimed in my application Serial No. 107,717 filed July 5, 1916 for Letters Patent of the United States.

My invention, herein claimed, includes the various novel features of construction and arrangement hereinafter more definitely specified.

In the drawings; Figure I is a diagrammatic elevation of a phonograph machine embodying my invention. Fig. II is a plan view of a motor controlling lever and its appurtenances, which are conveniently mounted upon the exterior of the casing containing the motor mechanism. Fig. III is a vertical sectional view of the controlling mechanism shown in Fig. II, taken on the line III—III. Fig. IV is a vertical sectional view of the controlling mechanism shown in Fig. II, taken on the line IV—IV. Fig. V is a plan view of the sheet metal frame base plate which supports said controlling lever. Fig. VI is a plan view, similar to Fig. II but showing a modified form of a motor controlling lever and its appurtenances. Fig. VII is a vertical sectional view of the controlling mechanism shown in Fig. VI, taken on the line VII, VII. Fig. VIII is a vertical sectional view of the controlling mechanism shown in Fig. VI, taken on the line VIII, VIII. Fig. IX is a plan view of the sheet metal frame base plate shown in Figs. VI to VIII inclusive.

Referring to Fig. I; the motor 1 includes the driving shaft 2, for the turn table 3, which is operatively connected, by the worm gear 4, to the worm 5 on the governor shaft 6 carrying the friction disk 7. Said disk is connected with said shaft 6 by means tending to move the disk axially upon said shaft in accordance with the rate of rotation of the latter, and away from the thrust bearing 8. Such means includes the springs 9 connecting said disk with the collar 10 which is fixed on said shaft, and each carrying a weight 11. The brake slide 12, which carries the brake block 13 for frictional engagement with said disk 6, is mounted to reciprocate toward and away from said disk, and is provided with the brake spring 14 tending to move said mechanism to stop said motor. Said brake mechanism has the connector 15 extending in coöperative connection with the controlling lever 16 which is fulcrumed upon a stud 17 held in stationary position by a frame detachably secured upon the top of the casing 18 which incloses said motor.

Referring to Figs. II to V inclusive; said controlling lever 16 is conveniently supported by the circular pressed sheet metal frame base plate 19 having the substantially central opening 20, the plane bearing flange 21, normal to the plane of said base plate, at one edge of said opening, with the rivet hole 22 in spaced relation to said plate 19, the spring supporting lug 25 extending from said flange 21, between said rivet hole and said base plate, the screw threaded aperture 26 in said base plate, remote from the center thereof, having its axis on a radial line parallel with said flange, as indicated in Fig. V, and a plurality of symmetrically arranged openings 28 in said base plate, for attaching means such as the screws 29. The circular cap plate 30 has the circumferential annular flange 31 overhanging the edge of said base plate 19, as shown in Figs. II and III, and the central slot 34 registering with said opening 20 in said base plate. Said cap plate also has the opening 35 larger than and registering with said threaded aperture 26 in said base plate, and also openings 36 registering with the openings in said base plate, for said screws 29. Said fulcrum stud 17 is riveted in said hole 22, as indicated in Fig. II, and extends transversely from said flange 21 in opposition to said opening 20 in said base plate. Said lever 16 is preferably formed of pressed and twisted sheet metal, fulcrumed on said stud, having a plane fulcrum portion, parallel with said flange 21 at said rivet stud, and also has the stop arm 38 extending therefrom in registry with said threaded opening 26, the plane handle arm 39 projecting through said central openings 20 and 34, respectively in said base plate and cap plate, and extending beyond the latter, above the casing top 18. Said level also has the plane connector arm 40 with the connector aperture 41 and the spring supporting lug 42. As shown in Fig. II, the planes of said handle and connector arms of said lever 16 are respectively normal to the plane of the fulcrum portion and stop arm of said lever.

The controller spring 43 extending from said base plate lug 25 to said lever arm lug 42 tends to snap and detain said lever at either limit of its movement in said slot 34. The adjustable stop screw 45 extends freely through said cap plate opening 35 in engagement with said threaded opening 26 in said base plate, and in registry with said stop arm 38, adjustably limiting the range of movement of said lever arm 40 by said spring 43, toward the right in Fig. III which is in the direction in which its movement is opposed by said brake spring 14 which exerts traction upon said connector 15 which extends loosely through said connector arm aperture 41 and has the abutment 47 which is adjustable thereon toward and away from said lever arm 40 so as to vary the effective length of said connector, with which said abutment 47 may be rigidly connected by the set screw 48.

It is to be understood that the construction and arrangement above described is such that the throw of said lever 16 may be varied, by adjustment of said screw 45, independently of the position of said abutment 47, and the movement of said lever, effective upon said connector 15 may be variably determined by adjustment of said abutment, with reference to the position of said screw 45.

In the form of my invention above described the adjusting screw 45 is entirely independent of said spring 43. However, I prefer to utilize said spring to not only snap and detain the controller lever at either limit of its movement, but to also continually frictionally engage the lever adjusting screw and thus prevent accidental displacement of said screw. I have shown such an embodiment of my invention in Figs. VI to IX inclusive, wherein the controlling lever 50 is conveniently supported by the circular pressed sheet metal frame base plate 53 having the substantially central opening 54, the plane bearing flange 55, normal to the plane of said base plate, at one edge of said opening, with the rivet hole 56 in spaced relation to said plate 53, the screw threaded aperture 57 in said base plate, remote from the center thereof, and a plurality of symmetrically arranged openings 58 in said base plate, for attaching means such as the screws 59. The circular cap plate 60 has the circumferential annular flange 61 overhanging the edge of said base plate 53, as shown in Figs. VII and VIII, and the central slot 63 registering with said opening 54 in said base plate. Said cap plate also has the opening 64 larger than and registering with said threaded aperture 57 in said base plate, and also openings 65 registering with the openings in said base plate, for said screws 59. The fulcrum stud 67 is riveted in said hole 56, as indicated in Fig. VII, and extends transversely from said flange 55 in opposition to said opening 54 in said base plate. Said lever 50 is preferably formed of pressed and twisted sheet metal, fulcrumed on said stud, having a plane fulcrum portion, parallel with said flange 55 at said rivet stud, and also has the stop arm 69 extending therefrom in registry with said threaded opening 57, and the plane handle arm 70 projecting through said central openings 54 and 63, respectively in said base plate and cap plate, and extending beyond the latter, above the casing top 71. Said lever also has the plane connector arm 72 with the connector aperture 73 and the spring supporting arm 74. As shown in Fig. VII, the planes of said handle and connector arms of said lever 50 are respectively normal to the plane of the fulcrum portion and stop arm of said lever.

The adjustable stop screw 75 extends freely through said cap plate opening 64 in engagement with said threaded opening 57 in said base plate, and in registry with said stop arm 69, adjustably limiting the range of movement of said lever arm 72 toward the right in Fig. VIII, which is the direction in which its movement is opposed by said brake spring 14 which exerts traction upon said connector 15 which extends loosely through said connector arm aperture 73 and has the abutment 47 which is adjustable thereon toward and away from said lever arm 72 so as to vary the effective length of said connector, with which said abutment 47 may be rigidly connected by the set screw 48. The controller spring 77 extending from the spring seat 78 at the lower end of said stop screw 75, to said lever arm 74, tends to snap and detain said lever at either limit of its movement in said slot 63.

It is to be understood that the construction and arrangement above described is such that the throw of said lever 50 may be varied, by adjustment of said screw 75, independently of the position of said abutment 47, and the movement of said lever, effective upon said connector 15, may be variably determined by adjustment of said abutment, with reference to the position of said screw 75.

Moreover, the arrangement above described, with reference to Fig. I, is such that as the rate of rotation of said worm shaft 6 increases, said friction disk 7 tends to move toward the right in that figure, and such motion is opposed by contact of said disk with the brake block 13. However, as said slide frame 12 may be shifted more or less toward the right in the drawing, by said connector 15, the position to which it is thus adjusted will predetermine and limit the maximum rate of rotation of said shaft 6. That is to say, the maximum limit of rotation of said shaft 6, permitted by the governor brake mechanism, increases with the increase of movement of said slide 12 toward the right in Fig. I; increase of the predetermined rate being prevented by frictional engagement of said disk 7 with said brake block 13 when that rate is reached, and, as said brake mechanism is so constructed and arranged that when it is released by the controlling lever and shifted by said spring 14 that it stops the rotation of said disk 7; said mechanism may be utilized to predetermine any rate of rotation of said shaft 6, and consequently of said shaft 2, up to the maximum of which the motor is capable.

Said motor, indicated in Fig. I, is so constructed and arranged as to turn said table 3 in the direction of the arrow shown in that figure. It is well known that rotation of a shaft by worm gearing, as described, imposes an endwise thrust thereon, such thrust being in the direction of the arrow in Fig. I. It is also well known that the operation of such a centrifugal brake mechanism as above described also imposes an endwise thrust on the governor shaft. In motors of the class herein contemplated, it is usual to so construct and arrange the worm gearing and the governor mechanism that the respective thrusts which they impose upon the governor shaft shall be in axially opposite directions, with the idea that they will neutralize each other and thus minimize the friction and wear upon the thrust bearing of the governor shaft. However, I have discovered that when thus constructed and arranged the axial stresses upon the governor shaft, respectively imposed by its worm gearing and by the centrifugal governor mechanism which it carries, do not in fact neutralize each other, except at rare intervals, but overbalance each other, in alternation, so that the governor shaft is alternately thrust in respectively opposite directions, with consequent variation in the degree of frictional engagement between the governor disk and brake block, causing fluctuations in the rate of rotation, which are more or less, in correspondence with the amount of play afforded said shaft in its bearings. Consequently, such fluctuations are manifested in the sound being reproduced from the record which is being operated by the motor. Therefore, it is to be particularly noted that in the construction and arrangement of my invention above described, the axial stresses respectively imposed upon the governor shaft by its worm gearing and by the governor mechanism are all in the same direction, at all times, and toward the thrust bearing 8. Consequently, variations in said axial stresses are manifested by variation in the pressure of said shaft 6 upon said bearing 8, but the latter variations are negligible in that they do not appreciably affect the rate of rotation of said shaft.

It is to be understood that said base plates 19 and 53 may be made of ordinary sheet metal, without any polish or finish upon its surface, and that the cap plates 30 and 60, which cover and conceal said base plates, may be plated and polished, or otherwise finished. It may be observed that the flanges 31 and 61 on the respective cap plates, which overhang the respective base plates so as to facilitate the assembling and retention of the superimposed plates in proper registered relation, have their lower edges in spaced relation with the surfaces of the respective casings 18 and 71 upon which the base plates rest, so that said base plates are secured in rigid relation with said surfaces by the attaching means extending through both of the superimposed plates; the spacing of said flanges being such as to permit such variations in thickness of the base plates as are found in commerce. If said flanges were not thus spaced, they might uphold the cap plates clear of the base plates, without rigidly securing the latter.

I do not desire to limit myself to the precise details of construction and arrangement herein set forth, as it is obvious that various modifications may be made therein without departing from the essential features of my invention as defined in the appended claims.

I claim:—

1. The combination with a circular sheet metal frame base plate having a substantially central opening, a plane bearing flange, normal to the plane of said base plate, at one edge of said opening, with a rivet hole, in spaced relation to said plate, a screw threaded aperture in said base plate, remote from the center thereof, and a plurality of symmetrically arranged openings in said base plate, for attaching means; of a circular cap plate having a circumferential annular flange overhanging the edge of said base plate, a central slot registering with the central opening in said base plate, an opening larger than, and registering with, said threaded aperture in said base plate, and openings registering with the openings in said base plate for attaching means; a fulcrum stud riveted in said rivet hole and extending transversely from said flange, in opposition to the central opening in said base plate; a lever, formed of twisted sheet metal, fulcrumed on said stud, having a plane fulcrum portion, parallel with said flange at said rivet, a stop arm extending therefrom in registry with said threaded opening, a spring supporting arm, opposite to said stop arm, a plane handle arm projecting through said central openings in said base plate and cap plate, and extending beyond the latter, and a plane connector arm having a connector aperture, the planes of said handle and connector arms being respectively normal to the plane of said fulcrum portion and stop arm of said lever; an adjustable stop screw extending freely through said cap plate, in engagement with said threaded opening in said base plate and in registry with said stop arm, adjustably limiting the range of movement of said lever, in one direction, and having a spring seat at its lower end; a spring extending from said stop screw to said lever spring arm, tending to snap and detain said lever, at either limit of its movement in said slot; a connector extending loosely through said connector arm aperture; an adjustable abutment on said connector; and a set screw carried by said abutment, arranged to detachably secure the latter in adjusted position on said connector; whereby the throw of said lever may be varied, by adjustment of said screw, independently of the position of said abutment, and the movement of said lever, effective upon said connector, may be variably determined by adjustment of said abutment, with reference to the position of said screw.

2. The combination with a sheet metal frame base plate having an opening, a bearing flange, at one edge of said opening, with a rivet hole, in spaced relation to said plate, a screw threaded aperture in said base plate; of a circular cap plate having a circumferential annular flange overhanging the edge of the said base plate, a slot registering with said opening in said base plate, and an opening larger than, and registering with, said threaded aperture in said base plate; a fulcrum stud riveted in said rivet hole and extending transversely from said flange; a lever, fulcrumed on said stud, having a stop arm extending in registry with said threaded opening, a spring supporting arm, a plane handle arm projecting through said central openings in said base plate and cap plate, and extending beyond the latter, and a connector arm having a connector aperture; an adjustable stop screw in engagement with said threaded opening in said base plate and in registry with said stop arm, adjustably limiting the range of movement of said lever, in one direction, and having a spring seat; a spring extending from said stop screw to said lever spring arm, tending to snap and detain said lever, at either limit of its movement in said slot; a connector extending loosely through said connector arm aperture; an adjustable abutment on said connector; and a set screw carried by said abutment, arranged to detachably secure the latter in adjusted position on said connector; whereby the throw of said lever may be varied, by adjustment of said screw, independently of the position of said abutment, and the movement of said lever, effective upon said connector, may be variably determined by adjustment of said abutment, with reference to the position of said screw.

3. The combination with a frame base plate having an opening, a bearing flange, at one edge of said opening, with a rivet hole, and a screw threaded aperture in said base plate; of a fulcrum stud riveted in said rivet hole and extending transversely from said flange; a lever, fulcrumed on said stud, having a stop arm extending in registry with said threaded opening, a spring supporting arm, a handle arm projecting through said central opening in said base plate, and extending beyond the latter, and a connector arm having a connector aperture; an adjustable stop screw in engagement with said threaded opening in said base plate and in registry with said stop arm, adjustably limiting the range of movement of said lever, in one direction, and having a spring seat; a spring extending from said stop screw to said lever spring arm, tending to snap and detain said lever, at either limit of its movement; a connector extending through said connector arm aperture; an adjustable abutment on said connector, and means carried by said abutment, arranged to detachably secure the latter in adjusted position on said connector; whereby the throw of said lever may be varied, by adjustment of said screw, independently of the position of said abutment, and the movement of said lever, effective upon said connector, may be variably determined by adjustment of said abutment, with reference to the position of said screw.

4. The combination with a frame base plate having a bearing flange, and a screw threaded aperture in said base plate; of a fulcrum stud extending from said flange; a lever, fulcrumed on said stud, having a stop arm extending in registry with said threaded opening, a handle arm, and a connector arm; a spring tending to snap and detain said lever, at either limit of its movement; an adjustable stop screw extending in engagement with said threaded opening in said base plate and in registry with said stop arm, adjustably limiting the range of movement of said lever, in one direction; and a connector extending from said connector arm; whereby the throw of said lever may be varied, by adjustment of said screw.

5. The combination with a base; of a lever fulcrumed on said base; a tension spring connecting said base and lever, tending to snap and detain said lever, at either limit of its movement; a connector extending from said lever; and means, carried by said base adjustably limiting the movement of said lever and connector.

6. The combination with a base; of a lever fulcrumed on said base; a spring tending to snap and detain said lever, at either limit of its movement; a connector extending from said lever permitting loss of motion between said lever and connector; and means, carried by said connector, adjustably limiting lost motion between said lever and connector.

7. The combination with a motor, having brake mechanism movable in one direction to permit said motor to operate, and in the opposite direction to stop it; the intermediate placement of said mechanism determining the rate of operation of said motor; of a brake spring tending to move said mechanism to stop said motor; a motor controlling device, including a lever; a connector from said lever to said brake mechanism; a controller spring tending to snap said lever to, and detain it at either limit of its movement; means adjustable to limit the throw of said lever in the direction opposed by said brake spring, including a screw arranged to encounter said lever; and means adjustable to variably determine the extent of the movement of said lever effective upon said brake mechanism, including an abutment on said connector.

8. The combination with a motor, having brake mechanism movable in one direction to permit said motor to operate, and in the opposite direction to stop it; the intermediate placement of said mechanism determining the rate of operation of said motor; of a brake spring tending to move said mechanism to stop said motor; a motor controlling device, including a lever; a connector from said lever to said brake mechanism; a controller spring tending to snap said lever to, and detain it at either limit of its movement; means adjustable to limit the throw of said lever in the direction opposed by said brake spring; and means adjustable to variably determine the extent of the movement of said lever effective upon said brake mechanism.

9. The combination with a motor, having brake mechanism movable in one direction to permit said motor to operate, and in the opposite direction to stop it; the intermediate placement of said mechanism determining the rate of operation of said motor; of a brake spring tending to move said mechanism to stop said motor; a motor controlling device, including a lever; a connector from said lever to said brake mechanism; a controller spring tending to detain said lever when at the limit of its movement in the direction opposed by said brake spring; means adjustable to limit the throw of said lever in the direction opposed by said brake spring, including a screw arranged to encounter said lever; and means adjustable to variably determine the extent of the movement of said lever effective upon said brake mechanism, including an abutment on said connector.

10. The combination with a motor, having brake mechanism movable in one direction to permit said motor to operate, and in the opposite direction to stop it; the intermediate placement of said mechanism determining the rate of operation of said motor; of a brake spring tending to move said mechanism to stop said motor; a motor controlling device, including a lever; a connector from said lever to said brake mechanism; a controller spring tending to detain said lever when at the limit of its movement in the direction opposed by said brake spring; means adjustable to limit the throw of said lever in the direction opposed by said brake spring; and means adjustable to variably determine the extent of the movement of said lever effective upon said brake mechanism.

11. The combination with a motor, having brake mechanism movable in one direction to permit said motor to operate, and in the opposite direction to stop it; the intermediate placement of said mechanism determining the rate of operation of said motor; of a brake spring tending to move said mechanism to stop said motor; a motor controlling device, including a lever; a connector from said lever to said brake mechanism; a controller spring tending to snap said lever to, and detain it at either limit of its movement; and means adjustable to variably determine the extent of the movement of said lever effective upon said brake mechanism.

12. The combination with a motor, having brake mechanism movable in one direction to permit said motor to operate, and in the opposite direction to stop it; the intermediate placement of said mechanism determining the rate of operation of said motor; of a brake spring tending to move said mechanism in one direction; a motor controlling device, connected to move said brake mechanism in the opposite direction; and means adjustable to limit the movement of said controlling device in the direction opposed by said brake spring.

13. The combination with a base; of a lever fulcrumed on said base; a screw carried by said base, adjustable to limit the range of movement of said lever, in one direction; and a spring connecting said lever with said screw, tending to snap and detain said lever at either limit of its movement; whereby said screw is frictionally held against accidental displacement.

14. The combination with a base; of a lever fulcrumed on said base; a screw carried by said base, adjustable to limit the range of movement of said lever, in one direction; and a spring connecting said lever with said screw, whereby the latter is frictionally held against accidental displacement.

15. The combination with a base plate having a fulcrum support, a lever opening and an opening for attaching means; of a cap plate having a flange overhanging the edge of said base plate, but less than the thickness of the latter, a lever opening, and an opening for attaching means arranged to register with the opening for attaching means in said base plate; a lever mounted on said fulcrum support and extending through both of said plates; and attaching means, extending through said registered openings in both of said plates; whereby said plates are engaged in registered relation by said flange, said base plate is held by said attaching means in rigid relation with the surface upon which it rests, and said cap plate is supported by said base plate with its flange in spaced relation with the surface upon which said base plate rests.

In testimony whereof I have hereunto signed my name at Philadelphia, Pennsylvania, this tenth day of July, 1916.

THEO CLIFFORD WHITING.

Witnesses:
ARTHUR E. PAIGE,
ANNA ISRAELVITZ.

Copies of this patent may be obtained for five cents each, by addressing the "Commissioner of Patents, Washington, D. C."